United States Patent
Han et al.

(10) Patent No.: US 10,826,053 B2
(45) Date of Patent: Nov. 3, 2020

(54) POSITIVE ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jeong-Woo Han, Yongin-si (KR); Sumihito Ishida, Yongin-si (KR); Jung-Woo An, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 645 days.

(21) Appl. No.: 14/840,070

(22) Filed: Aug. 31, 2015

(65) Prior Publication Data

US 2016/0087261 A1  Mar. 24, 2016

(30) Foreign Application Priority Data

Sep. 23, 2014 (KR) ........................ 10-2014-0126797

(51) Int. Cl.
| | | |
|---|---|---|
| H01M 4/13 | (2010.01) |
| H01M 4/52 | (2010.01) |
| H01M 4/50 | (2010.01) |
| H01M 4/58 | (2010.01) |
| H01M 10/05 | (2010.01) |
| H01M 4/70 | (2006.01) |

(Continued)

(52) U.S. Cl.
CPC ........... *H01M 4/131* (2013.01); *H01M 4/136* (2013.01); *H01M 4/525* (2013.01); *H01M 4/70* (2013.01); *H01M 4/505* (2013.01); *H01M 4/5825* (2013.01); *H01M 10/0525* (2013.01); *H01M 2004/021* (2013.01)

(58) Field of Classification Search
CPC ...... H01M 4/131; H01M 4/136; H01M 4/525; H01M 4/5825; H01M 10/0525; H01M 4/505; H01M 2004/021
See application file for complete search history.

(56) References Cited

U.S. PATENT DOCUMENTS

| | | | | |
|---|---|---|---|---|
| 8,329,339 B2 * | 12/2012 | Chang | ................... | H01M 4/131 252/521.1 |
| 8,343,663 B2 * | 1/2013 | Jung | ................... | C01G 53/006 29/623.1 |

(Continued)

FOREIGN PATENT DOCUMENTS

| | | |
|---|---|---|
| JP | 11-086875 A | 3/1999 |
| JP | 2005-285447 A | 10/2005 |

(Continued)

*Primary Examiner* — Jonathan Crepeau
*Assistant Examiner* — Angela J Martin
(74) *Attorney, Agent, or Firm* — Lee IP Law, P.C.

(57) ABSTRACT

A positive electrode for a rechargeable lithium battery, includes a current collector including pores on a surface thereof; and a positive active material layer on the current collector and including a positive active material, the positive active material including a lithium metal compound including primary particles and secondary particles including agglomerations of the primary particles, an average diameter of the pores of the current collector being greater than an average particle diameter (D50) of the primary particles and less than an average particle diameter (D50) of the secondary particles.

6 Claims, 7 Drawing Sheets

(51) Int. Cl.
  *H01M 4/131* (2010.01)
  *H01M 4/136* (2010.01)
  *H01M 4/525* (2010.01)
  *H01M 4/505* (2010.01)
  *H01M 4/02* (2006.01)
  *H01M 10/0525* (2010.01)

(56) References Cited

U.S. PATENT DOCUMENTS

| | | | | |
|---|---|---|---|---|
| 8,765,304 B2* | 7/2014 | Isozaki | ............... | H01M 4/131 180/65.31 |
| 2009/0142668 A1* | 6/2009 | Ishii | ............... | G11B 5/596 429/231.8 |
| 2010/0119945 A1* | 5/2010 | Akagi | ............... | H01M 4/131 429/231.8 |
| 2011/0294007 A1* | 12/2011 | Hosaka | ............... | H01M 2/08 429/210 |
| 2012/0045685 A1* | 2/2012 | Seki | ............... | H01G 11/12 429/153 |
| 2012/0171561 A1* | 7/2012 | Iwasa | ............... | H01G 11/32 429/188 |
| 2014/0199582 A1* | 7/2014 | Sasaki | ............... | H01M 4/043 429/162 |
| 2014/0315100 A1* | 10/2014 | Wang | ............... | H01M 4/366 429/319 |
| 2014/0375325 A1* | 12/2014 | Wang | ............... | H01M 4/70 324/426 |
| 2015/0147614 A1* | 5/2015 | Wang | ............... | G01R 31/3624 429/93 |

FOREIGN PATENT DOCUMENTS

| | | |
|---|---|---|
| JP | 2011-165637 A | 8/2011 |
| KR | 10-2004-0096381 A | 11/2004 |
| KR | 10-2007-0083368 A | 8/2007 |

* cited by examiner

POSITIVE ELECTRODE FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2014-0126797, filed on Sep. 23, 2014, in the Korean Intellectual Property Office, and entitled: "Positive Electrode for Rechargeable Lithium Battery and Rechargeable Lithium Battery Including the Same," is incorporated by reference herein in its entirety.

BACKGROUND

1. Field

A positive electrode for a rechargeable lithium battery and a rechargeable lithium battery including the same.

2. Description of the Related Art

The size and weight of portable electronic equipment may be reduced, and portable electronic devices may be used. Rechargeable lithium batteries may have high energy density for power source of portable electronic devices.

SUMMARY

Embodiments may be realized by providing a positive electrode for a rechargeable lithium battery, including a current collector including pores on a surface thereof; and a positive active material layer on the current collector and including a positive active material, the positive active material including a lithium metal compound including primary particles and secondary particles including agglomerations of the primary particles, an average diameter of the pores of the current collector being greater than an average particle diameter (D50) of the primary particles and less than an average particle diameter (D50) of the secondary particles.

The average diameter of the pores may be about 0.2 μm to about 10 μm.

The pores of the current collector may be formed by etching the surface of the current collector.

The average particle diameter (D50) of the primary particles may be about 0.2 μm to about 1 μm.

The average particle diameter (D50) of the secondary particles may be about 1 μm to about 15 μm.

The lithium metal compound may include $LiFePO_4$, $LiNi_aCo_bMn_cO_2$ ($0.2 \le a \le 0.6$, $0.2 \le b \le 0.6$, $0.2 \le c \le 0.6$), or a combination thereof.

The positive active material layer may further include activated carbon.

The lithium metal compound may be included in an amount of about 55.5 wt % to about 99.5 wt % based on a total amount of the lithium metal compound and the activated carbon.

A rechargeable lithium battery may include the presently disclosed positive electrode; a negative electrode including a negative active material; and an electrolyte.

The negative active material may include amorphous carbon.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
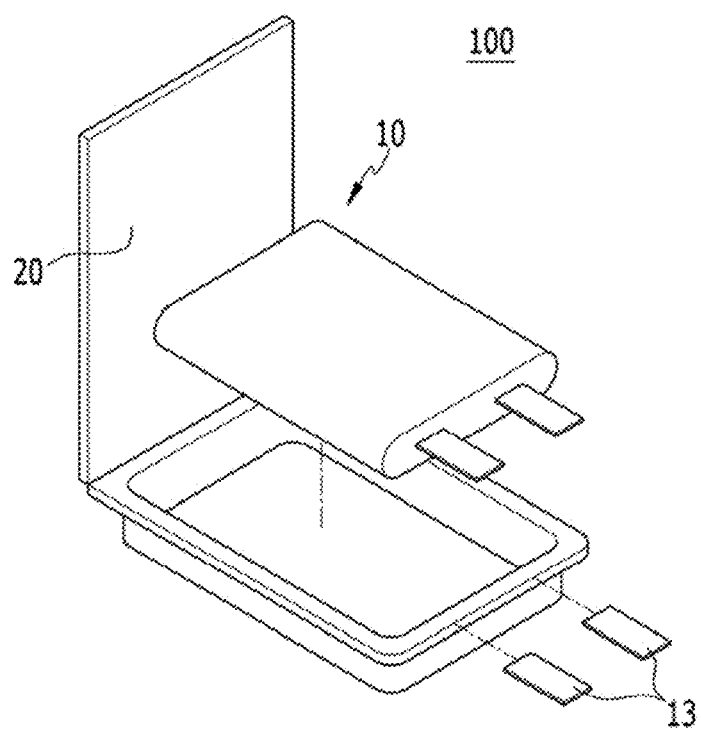
FIG. 1 illustrates a schematic view of a rechargeable lithium battery according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

As used herein, when a definition is not otherwise provided, an average particle diameter (D50) indicates a diameter corresponding to 50 volume % of a cumulative particle diameter in a particle distribution.

As used herein, when a definition is not otherwise provided, the average diameter of pores in a current collector may be measured by examining their microstructure through a scanning electron microscope (SEM) image, and the average particle diameter of primary and secondary particles may be measured using a laser diffraction particle diameter analyzer.

A positive electrode for a rechargeable lithium battery according to one embodiment may include a current collector and a positive active material layer disposed on the current collector. The positive active material layer may include a positive active material, a binder and optionally a conductive material.

The current collector may be, for example, aluminum (Al).

The current collector may be porous, and may have, for example, pores on a surface of the current collector. The pores may be formed by etching the surface of the current collector.

The pores may be formed on the surface of the current collector, and a contact point of the positive active material in the positive active material layer with the current collector and also, a contact point of the conductive material optionally present in the positive active material layer with the current collector may be increased. The current collector having the pores on the surface thereof may have a larger surface area than a current collector having no pores, a path for electron flow may be increased, and high-rate charge and discharge characteristics of a rechargeable lithium battery may be improved. The relatively large surface area of the current collector having the pores on the surface thereof may increase a bonding strength of the current collector with the positive active material layer, and may improve cycle-life characteristics of a rechargeable lithium battery.

The average diameter of the pores may be about 0.2 μm to about 10 μm, for example, about 0.4 μm to about 5 μm. Maintaining the average diameter of the pores within the above range, may help increase the surface area of the current collector, and electrical conductivity and bonding strength may be increased.

The positive active material may include a lithium metal compound as a compound capable of intercalating and deintercalating lithium.

The lithium metal compound may be an oxide or phosphate containing lithium and a metal. For example, the lithium metal compound may be an oxide or phosphate including primary particles and secondary particles formed by agglomeration of the primary particles.

The lithium metal compound including of the primary and secondary particles may include, for example, LiFePO$_4$, LiNi$_a$Co$_b$Mn$_c$O$_2$ (0.2≤a≤0.6, 0.2≤b≤0.6, 0.2≤c≤0.6), or a combination thereof.

The average particle diameter (D50) of the primary particles may be about 0.2 μm to about 1 μm, for example, about 0.2 μm to about 0.7 μm. The average particle diameter (D50) of the secondary particles may be about 1 μm to about 15 μm, for example, about 2 μm to about 8 μm. Maintaining the average particle diameter of the primary and secondary particles, respectively, within the above ranges, the positive active material may have more contact points with the pores of the current collector, and may provide an excellent current flow and improved high-rate charge and discharge characteristics and cycle-life characteristics of a rechargeable lithium battery.

The high-rate charge and discharge characteristics and cycle-life characteristics of a rechargeable lithium battery may be further improved by adjusting the size of the pores on the surface of the current collector and the size of the positive active material.

For example, the average diameter of the pores of the current collector may be greater than the average particle diameter (D50) of primary particles of the positive active material and less than the average particle diameter (D50) of the secondary particles. Adjusting a ratio between the size of the pores of the current collector and the size of the positive active material as above may help obtain a contact point between the current collector and the positive active material may be obtained and decrease internal resistance of an electrode, and may increase electrical conductivity and bonding strength therebetween and secure excellent high-rate charge and discharge characteristics and cycle-life characteristics. For example, the average diameter of the pores of the current collector may be about 0.4 μm to about 5 μm, the average particle diameter (D50) of the primary particles may be about 0.2 μm to about 0.7 μm, and the average particle diameter (D50) of the secondary particles may be about 2 μm to about 8 μm.

The positive active material layer may include activated carbon in addition to the lithium metal compound. The activated carbon may help further improve high-rate charge and discharge characteristics, for example, due to a physical adsorption and desorption effect.

The lithium metal compound may be included in an amount of about 55.5 wt % to about 99.5 wt %, for example, about 70 wt % to about 95 wt % based on a total amount of the positive active material, e.g., the lithium metal compound and the activated carbon. Mixing the lithium metal compound with the activated carbon within the above ratio range may help further improved high-rate charge and discharge characteristics.

The conductive material provides a positive electrode with conductivity. Any electrically conductive material may be used as a conductive material unless it causes a chemical change. Examples of the conductive material include one or more of natural graphite, artificial graphite, carbon black, acetylene black, ketjen black, a carbon fiber, a metal powder, a metal fiber, copper, nickel, aluminum, silver, and a conductive material such as a polyphenylene derivative.

The positive active material layer may further include a binder in addition to the positive active material and the conductive material.

The binder may improve binding properties of the positive active material particles to each other and to a current collector. Examples include, for example, polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

Hereinafter, a rechargeable lithium battery including the positive electrode is described referring to FIG. 1.

FIG. 1 illustrates a schematic view of a rechargeable lithium battery according to one embodiment.

Referring to FIG. 1, a rechargeable lithium battery 100 according to one embodiment may include an electrode assembly 10, a battery case 20 housing the electrode assembly 10, and an electrode tab 13 playing a role of an electrical path for externally leading a current formed in the electrode assembly 10. Both sides of the battery case 20 may be overlapped to face each other and sealed together. An electrolyte may be injected into the battery case 20 housing the electrode assembly 10.

The electrode assembly 10 may include a positive electrode, a negative electrode facing the positive electrode, and a separator interposed between the positive and negative electrodes.

In an embodiment, a shape or a kind of the rechargeable lithium battery may be, for example, cylindrical, prismatic, or pouch-type.

The positive electrode may be the same as described above.

The negative electrode may include a current collector and a negative active material layer disposed on the current collector.

The current collector may be, for example, a copper foil, a nickel foil, a stainless steel foil, a titanium foil, a nickel foam, a copper foam, a polymer substrate coated with a conductive metal, or a combination thereof.

The negative active material layer may include a negative active material, a binder and optionally a conductive material.

The negative active material may include a material that reversibly intercalates/deintercalates lithium ions, a lithium metal, a lithium metal alloy, material being capable of doping and dedoping lithium, or a transition metal oxide.

The material that reversibly intercalates/deintercalates lithium ions may be a carbon-based material. Examples thereof include crystalline carbon, amorphous carbon, and mixtures thereof. The crystalline carbon may be non-shaped, or sheet, flake, spherical, or fiber shaped natural graphite or artificial graphite. The amorphous carbon may be, for example, a soft carbon, a hard carbon, a mesophase pitch carbonization product, fired coke.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be, for example, Si, $SiO_x$ (0<x<2), a Si—C composite, a Si—Y alloy (wherein Y is one or more of an alkali metal, an alkaline-earth metal, a Group 13 to 16 element, a transition metal, or a rare earth element, and not Si), Sn, $SnO_2$, a Sn—C composite, or Sn—Y (wherein Y is one or more of an alkali metal, an alkaline-earth metal, a Group 13 to 16 element, a transition metal, or a rare earth element, and not Sn). At least one of these materials may be mixed with $SiO_2$. The element Y is one or more of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, or Po.

The transition metal oxide may include, for example, vanadium oxide or lithium vanadium oxide.

In one embodiment, the negative active material may be the amorphous carbon. The amorphous carbon may have low resistance, and high-rate charge and discharge characteristics may be improved.

The binder may improve binding properties of negative active material particles with one another and with a current collector, and examples thereof include, for example, polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive material may provide electrode conductivity. Any electrically conductive material may be used as a conductive material unless it causes a chemical change. Examples of the conductive material include carbon-based materials such as, for example, natural graphite, artificial graphite, carbon black, acetylene black, ketjen black, carbon fibers; metal-based materials of metal powder or metal fiber including, for example, copper, nickel, aluminum, silver; conductive polymers such as polyphenylene derivatives; and mixtures thereof.

The positive electrode and the negative electrode may be manufactured by a method including mixing each active material, a conductive material and a binder in a solvent to prepare an active material composition, and coating the composition on a current collector. The electrode manufacturing method is not described in detail in the present specification. The solvent may include, for example, N-methylpyrrolidone.

The electrolyte may include a non-aqueous organic solvent and a lithium salt.

The non-aqueous organic solvent may serve as a medium for transmitting ions taking part in the electrochemical reaction of a battery. The non-aqueous organic solvent may be a carbonate-based, ester-based, ether-based, ketone-based, alcohol-based, or aprotic solvent.

Examples of the carbonate-based solvent may include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC).

The linear carbonate compounds and cyclic carbonate compounds may be mixed, and an organic solvent having high dielectric constant and low viscosity may be provided. The cyclic carbonate and the linear carbonate may be mixed together in a volume ratio ranging from about 1:1 to about 1:9.

Examples of the ester-based solvent include n-methylacetate, n-ethylacetate, n-propylacetate, dimethylacetate, methylpropionate, ethylpropionate, γ-butyrolactone, decanolide, valerolactone, mevalonolactone, and caprolactone. Examples of the ether-based solvent include dibutyl ether, tetraglyme, diglyme, dimethoxyethane, 2-methyltetrahydrofuran, and tetrahydrofuran, and examples of the ketone-based solvent include cyclohexanone. Examples of the alcohol-based solvent include ethyl alcohol and isopropyl alcohol.

The non-aqueous organic solvent may be used singularly or in a mixture. When the organic solvent is used in a mixture, the mixture ratio may be controlled in accordance with a desirable battery performance.

The electrolyte solution may further include an overcharge inhibitor additive such as, for example, ethylenecarbonate or pyrocarbonate.

The lithium salt may be dissolved in an organic solvent, may supply lithium ions in a battery, may basically operate the rechargeable lithium battery, and may improve lithium ion transportation between positive and negative electrodes therein.

Examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, LiN $LiN(C_xF_{2x+1}SO_2)(C_yF_{2y+1}SO_2)$ wherein x and y are natural numbers, e.g., an integer of 1 to 20), LiCl, LiI, $LiB(C_2O_4)_2$ (lithium bis(oxalato) borate; LiBOB), and combinations thereof.

The lithium salt may be used in a concentration ranging from about 0.1 M to about 2.0 M. Including the lithium salt within the above concentration range may help provide an electrolyte having excellent performance and lithium ion mobility, for example, due to optimal electrolyte conductivity and viscosity.

The separator may include any materials used in a lithium battery provided that the separator separates a negative electrode from a positive electrode and provides a transporting passage for lithium ions. The separator 113 may be made of a material having a low resistance to ion transportation and an excellent impregnation for an electrolyte solution. For example, the material may be glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as, for example, polyethylene or polypropylene, may be used for a lithium ion battery. A separator coated with a ceramic component or a polymer material may help provide heat resistance or mechanical strength. Optionally, the separator may have a mono-layered or multi-layered structure.

The rechargeable lithium battery according to one embodiment may be applied to an ISG (idle stop and go) vehicle operated by an ISG system as well as to various electronic devices.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Manufacture of Positive Electrode)

EXAMPLE 1

A slurry was prepared by adding 85 wt % of LiFePO$_4$ having a primary particle with an average particle diameter (D50) of 0.4 μm and a secondary particle with an average particle diameter (D50) of 5 μm, 5 wt % of activated carbon (YP 50, Kuraray Co., Ltd.), 4 wt % of carbon black, and 6 wt % of polyvinylidene fluoride to an N-methylpyrrolidone (NMP) solvent. The slurry was coated on an aluminum (Al) thin film (CS, KOREA JCC) on the surface of which pores having an average diameter of 0.6 μm were formed and then, dried and compressed, manufacturing a positive electrode. The average particle diameters of the primary and secondary particles were measured using a laser diffraction particle diameter analyzer, and the average diameter of the pores was measured by a microstructure analysis through a scanning electron microscope (SEM) image.

EXAMPLE 2

A slurry was prepared by adding 85 wt % of LiNi$_{1/3}$Co$_{1/3}$Mn$_{1/3}$O$_2$ having a primary particle with an average particle diameter (D50) of 0.4 μm and a secondary particle with an average particle diameter (D50) of 5 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film (CS, JCC KOREA) on the surface of which pores having an average diameter of 0.6 μm were formed and then, dried and compressed, manufacturing a positive electrode.

EXAMPLE 3

A slurry was prepared by adding 85 wt % of LiFePO$_4$ having a primary particle with an average particle diameter (D50) of 0.3 μm and a secondary particle with an average particle diameter (D50) of 5 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film (CS, JCC KOREA) on the surface of which pores having an average diameter of 0.6 μm were formed and then, dried and compressed, manufacturing a positive electrode.

EXAMPLE 4

A slurry was prepared by adding 85 wt % of LiNi$_{1/3}$Co$_{1/3}$Mn$_{1/3}$O$_2$ having a primary particle with an average particle diameter (D50) of 0.3 μm and a secondary particle with an average particle diameter (D50) of 5 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film (CS, JCC KOREA) on the surface of which pores having an average diameter of 0.6 μm were formed and then, dried and compressed, manufacturing a positive electrode.

COMPARATIVE EXAMPLE 1

A slurry was prepared by adding 85 wt % of LiCoO$_2$ having an average particle diameter (D50) of 4 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film (CS, JCC KOREA) on the surface of which pores having an average diameter of 0.6 μm were formed and then, dried and compressed, manufacturing a positive electrode.

COMPARATIVE EXAMPLE 2

A slurry was prepared by adding 85 wt % of LiMnO$_2$ having an average particle diameter (D50) of 4 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film (CS, JCC KOREA) on the surface of which pores having an average diameter of 0.6 μm were formed and then, dried and compressed, manufacturing a positive electrode.

COMPARATIVE EXAMPLE 3

A slurry was prepared by adding 85 wt % of LiFePO$_4$ having a primary particle with an average particle diameter (D50) of 1 μm and a secondary particle with an average particle diameter (D50) of 5 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film (CS, JCC KOREA) on the surface of which pores having an average diameter of 0.6 μm were formed and then, dried and compressed, manufacturing a positive electrode.

COMPARATIVE EXAMPLE 4

A slurry was prepared by adding 85 wt % of LiFePO$_4$ having a primary particle with an average particle diameter (D50) of 0.4 μm and a secondary particle with an average particle diameter (D50) of 5 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film and then, dried and compressed, manufacturing a positive electrode.

COMPARATIVE EXAMPLE 5

A slurry was prepared by adding 85 wt % of LiNi$_{1/3}$Co$_{1/3}$Mn$_{1/3}$O$_2$ having a primary particle with an average particle diameter (D50) of 0.4 μm and a secondary particle with an average particle diameter (D50) of 5 μm, 5 wt % of activated carbon, 4 wt % of carbon black, and 6 wt % of polyvinylidene fluoride to an N-methylpyrrolidone (NMP) solvent. The slurry was coated on an aluminum (Al) thin film and then, dried and compressed, manufacturing a positive electrode.

(Manufacture of Rechargeable Lithium Battery Cell)

A slurry was prepared by adding 90 wt % of soft carbon, 5 wt % of carbon black, and 5 wt % of polyvinylidene fluoride to an N-methylpyrrolidone (NMP) solvent. The slurry was coated on a copper foil and then, dried and compressed, manufacturing a negative electrode.

An electrolyte solution was prepared by mixing ethylenecarbonate (EC), ethylmethylcarbonate (EMC) and dimethylcarbonate (DMC) in a volume ratio of 3:4:4 and dissolving 1M LiPF$_6$ in the organic solvent.

The positive and negative electrodes, the electrolyte solution and a separator made of a polyethylene material were used to manufacture a 50 mAh-level pouch-type rechargeable lithium battery cell.

Evaluation 1: SEM Analysis of Positive Electrode

A scanning electron microscope (SEM) analysis was performed on the primary and secondary particles of each lithium metal compound and the pores of the current collector used to manufacture the positive electrodes according to Examples 1 and 2, and the results are provided in FIGS. 2A to 2C and FIGS. 3A to 3C.

Figure 2A:
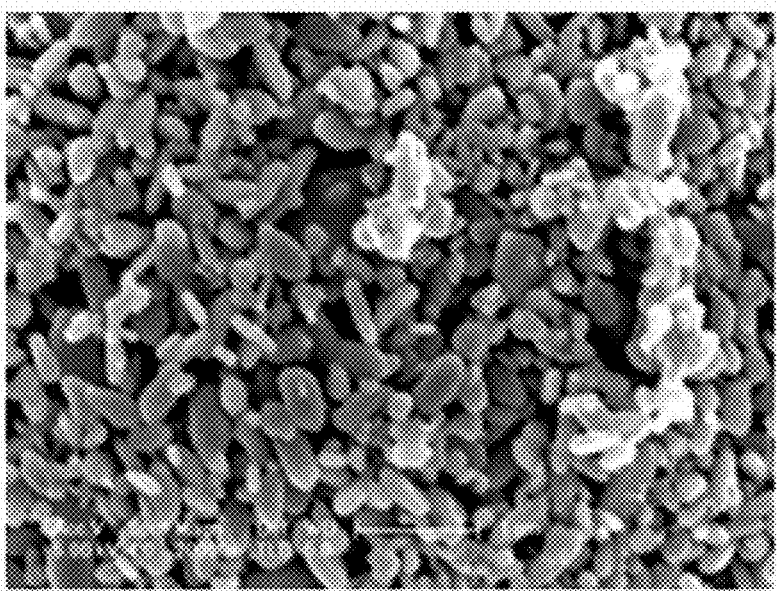
FIG. 2A illustrates a scanning electron microscope (SEM) photograph of primary particles of a lithium metal compound used to manufacture a positive electrode of Example 1.
Figure 2B:
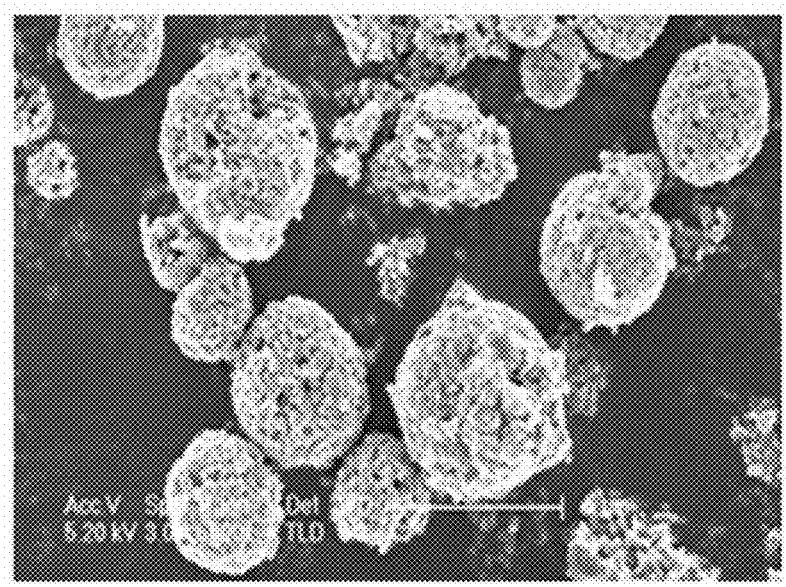
FIG. 2B illustrates a scanning electron microscope (SEM) of secondary particles of a lithium metal compound used to manufacture the positive electrode of Example 1.
Figure 2C:
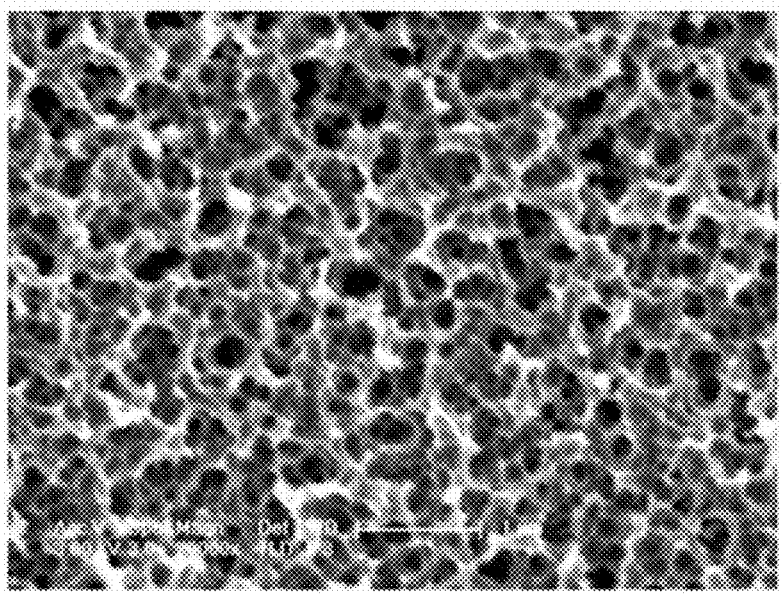
FIG. 2C illustrates a scanning electron microscope (SEM) of the cross-section of pores in a current collector used to manufacture the positive electrode of Example 1.

FIG. 2A illustrates a scanning electron microscope (SEM) photograph of a lithium metal compound used to manufacture the positive electrode of Example 1, FIG. 2B illustrates a scanning electron microscope (SEM) photograph of a lithium metal compound used to manufacture the positive electrode of Example 2, and FIG. 2C illustrates a scanning electron microscope (SEM) photograph of the cross-section of the pores in the current collector used to manufacture the positive electrode of Example 1.

Figure 3A:
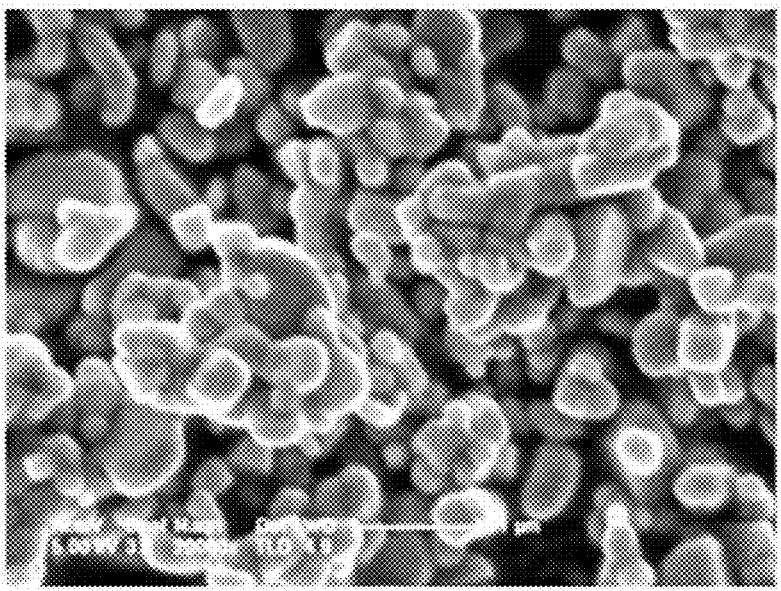
FIG. 3A illustrates a scanning electron microscope (SEM) of primary particles of a lithium metal compound used to manufacture a positive electrode of Example 2.
Figure 3B:
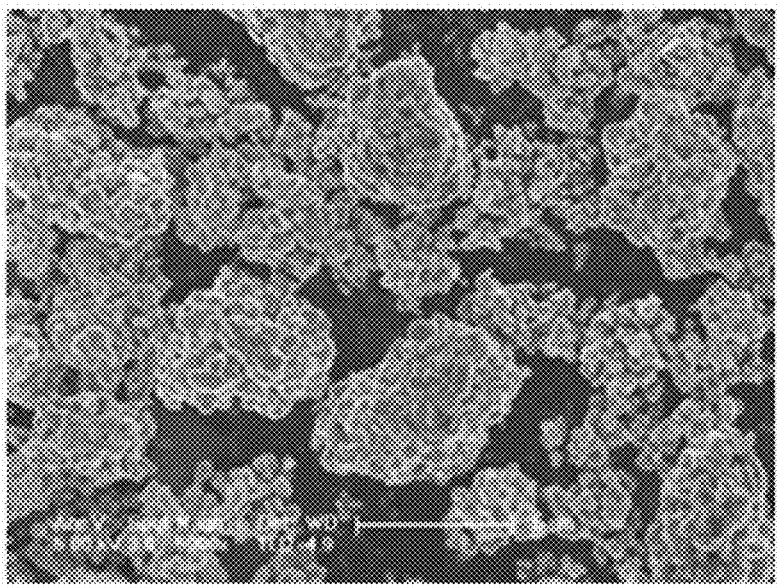
FIG. 3B illustrates a scanning electron microscope (SEM) of secondary particles of a lithium metal compound used to manufacture the positive electrode of Example 2.
Figure 3C:
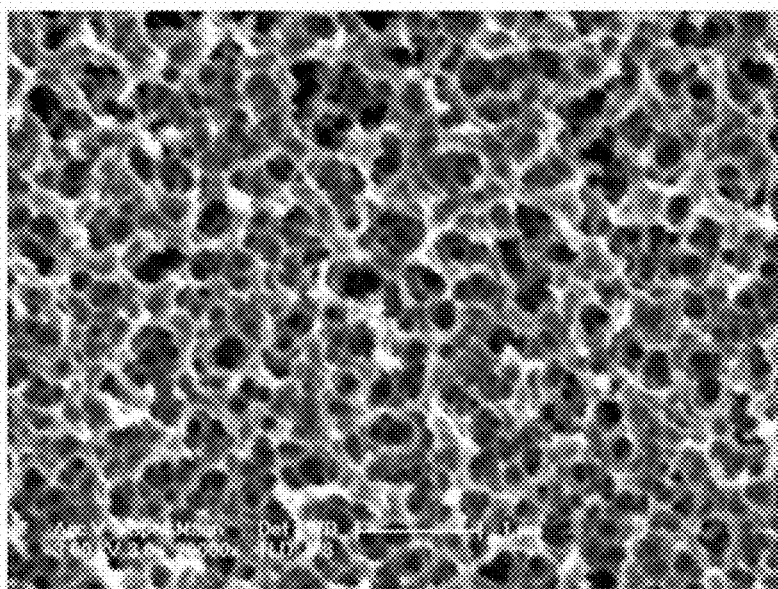
FIG. 3C illustrates a scanning electron microscope (SEM) of the cross-section of pores in a current collector to manufacture the positive electrode of Example 2.

FIG. 3A illustrates a scanning electron microscope (SEM) of primary particles of the lithium metal compound used to manufacture the positive electrode of Example 2, FIG. 3B illustrates a scanning electron microscope (SEM) of secondary particles of the lithium metal compound used to manufacture the positive electrode of Example 2, and FIG. 3C illustrates a scanning electron microscope (SEM) photograph of the cross-section of the pores in the current collector used to manufacture the positive electrode of Example 2.

Referring to FIGS. 2A to 2C and FIGS. 3A to 3C, in Examples 1 and 2 the average diameter of the pores of the current collector was larger than the average particle diameter (D50) of the primary particles of the lithium metal compound but smaller than average particle diameter (D50) of the secondary particles of the lithium metal compound.

Evaluation 2: Rate Capability of Rechargeable Lithium Battery Cell

The rechargeable lithium battery cells according to Examples 1 to 4 and Comparative Examples 1 to 5 were charged and discharged under the following conditions, their rate capability was evaluated, and the results are provided in the following Table 1.

The rechargeable lithium battery cells were constant current-charged at a current of 1 C current at a cut-off voltage 4.2V and then, discharged to 2.0 V at a current of 30 C.

In the following Table 1, a cycle-life retention ratio (%) was obtained as a percentage of discharge capacity at a 30 C-rate relative to discharge capacity at a 1 C-rate.

Evaluation 3: Cycle-life Characteristics of Rechargeable Lithium Battery Cell

The rechargeable lithium battery cells according to Examples 1 to 4 and Comparative Examples 1 to 5 were charged and discharged under the following condition, and their cycle-life characteristics were evaluated and provided in the following Table 1.

The rechargeable lithium battery cells were constant current-charged at a current of 1 C and discharged to 2.0 V at a current of 30 C after cutting-off the charge at 4.2 V.

In the following Table 1, the cycle-life retention ratio (%) was obtained as a percentage of $1000^{th}$ cycle discharge capacity relative to $1^{st}$ cycle discharge capacity at the 30 C-rate.

TABLE 1

|  | Initial capacity (mAh) | 30 C/1 C ratio (%) | $1000^{th}/1^{th}$ 30 C cycle-life retention ratio (%) |
| --- | --- | --- | --- |
| Example 1 | 150 | 92 | 97 |
| Example 2 | 150 | 92 | 97 |
| Example 3 | 150 | 90 | 95 |
| Example 4 | 150 | 90 | 95 |
| Comparative Example 1 | 150 | 90 | 93 |
| Comparative Example 2 | 130 | 90 | 93 |
| Comparative Example 3 | 150 | 87 | 91 |
| Comparative Example 4 | 150 | 87 | 91 |
| Comparative Example 5 | 150 | 87 | 91 |

Referring to Table 1, Examples 1 to 4 using the positive electrodes according to embodiments, in which the average diameter of the pores of the current collector was larger than the average particle diameter (D50) of the primary particles of the lithium metal compound but smaller than the average particle diameter (D50) of the secondary particles of the lithium metal compound, exhibited excellent high-rate charge and discharge characteristics and cycle-life characteristics compared with Comparative Examples 1 and 2 using a lithium metal compound hardly capable of forming a primary particle, Comparative Example 3 using the positive electrode in which the average diameter of the pores in the current collector was smaller than the average particle diameter (D50) of the primary particles of the lithium metal compound, and Comparative Examples 4 and 5 using the current collector having no pores on the surface.

By way of summation and review, a rechargeable lithium battery may be manufactured by injecting an electrolyte solution into an electrode assembly, which may include a positive electrode including a positive active material capable of intercalating/deintercalating lithium ions and a negative electrode including a negative active material capable of intercalating/deintercalating lithium ions. A rechargeable lithium battery for an ISG (idle stop and go) vehicle using an ISG system may require high input and output characteristics.

Disclosed is a positive electrode for a rechargeable lithium battery that may have excellent high-rate charge and discharge characteristics and cycle-life characteristics. Also disclosed is a rechargeable lithium battery including the positive electrode for a rechargeable lithium battery in which excellent high-rate charge and discharge characteristics and cycle-life characteristics may be realized.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode for a rechargeable lithium battery, comprising:
   a current collector including pores etched into a surface thereof; and
   a positive active material layer on the current collector and including a positive active material, the positive active material including both primary particles and secondary particles of a lithium metal compound, the secondary particles including agglomerations of the primary particles, an average diameter of the pores of the current collector being greater than an average particle diameter (D50) of the primary particles and less than an average particle diameter (D50) of the secondary particles, wherein:

the average diameter of the pores is about 0.4 μm to about 5 μm, the average particle diameter (D50) of the primary particles is about 0.2 μm to about 0.7 μm, and the average particle diameter (D50) of the secondary particles is about 2 μm to about 8 μm.

2. The positive electrode as claimed in claim 1, wherein the lithium metal compound includes LiFePO$_4$, LiNi$_a$Co$_b$Mn$_c$O$_2$ (0.2≤a≤0.6, 0.2≤b≤0.6, 0.2≤c≤0.6), or a combination thereof.

3. The positive electrode as claimed in claim 1, wherein the positive active material layer further includes activated carbon.

4. The positive electrode as claimed in claim 3, wherein the lithium metal compound is included in an amount of about 55.5 wt % to about 99.5 wt % based on a total amount of the lithium metal compound and the activated carbon.

5. A rechargeable lithium battery, comprising:

the positive electrode as claimed in claim 1;

a negative electrode including a negative active material; and an electrolyte.

6. The rechargeable lithium battery as claimed in claim 5, wherein the negative active material includes amorphous carbon.

* * * * *